United States Patent [19]
Probst et al.

[11] 3,799,403
[45] Mar. 26, 1974

[54] PLURAL COMPONENT DISPENSING DEVICE AND METHOD

[75] Inventors: Richard O. Probst; Albert H. Moos, Indianapolis, both of Ind.

[73] Assignee: Ransburg Corporation, Indianapolis, Ind.

[22] Filed: Apr. 26, 1973

[21] Appl. No.: 354,527

Related U.S. Application Data

[63] Continuation-in-part of Ser. No. 150,366, June 7, 1971.

[52] U.S. Cl.................. 222/135, 222/148, 239/414
[51] Int. Cl............................................. B67d 5/54
[58] Field of Search ........... 222/135, 136, 148, 194, 222/144.5, 145; 239/401, 414, 416

[56] References Cited
UNITED STATES PATENTS

| 3,555,910 | 1/1971 | Spence et al. ...................... 222/194 |
| 3,541,023 | 11/1970 | Cole............................... 222/135 X |
| 3,437,273 | 4/1969 | Hagfors.............................. 239/414 |

*Primary Examiner*—Stanley H. Tollberg
*Attorney, Agent, or Firm*—Merrill N. Johnson; Harry E. Downer; David H. Badger

[57] ABSTRACT

A plural component dispensing device and method wherein the mixing chamber of the device is movable with respect to the housing of such device so that a gas can be used to purge the mixing chamber of the residue of plural component material upon termination of the dispensing operation.

23 Claims, 7 Drawing Figures

INVENTORS
RICHARD O. PROBST
ALBERT H. MOOS

PLURAL COMPONENT DISPENSING DEVICE AND METHOD

This patent application is a continuation-in-part of U.S. patent application Ser. No. 150,366, filed June 7, 1971.

The present invention relates to means for and a method of dispensing materials, and, more particularly, to a device for and method of dispensing thermoplastic and thermosetting plural component materials such as urethane foams and coatings, catalyzed polyesters, catalyzed epoxies and other chemical compositions that react rapidly upon mixing of the components thereof.

Polyurethane foam systems, for example, usually include component A, an isocyanate, and component B, a preformulated compound comprising a polyether resin, a catalyst, a surfactant and a blowing agent. Each component of the plural component material is, by itself, generally stable, that is, each component does not cure or cross-link for several months or more provided it is properly stored. However, mixing of component A and component B in proper concentrations with appropriate agitation initiates a chemical reaction that causes the components to begin to polymerize and generate heat which volatilizes the blowing agent which causes the polyurethane to foam, cure and cross-link. In one polyurethane system water is used to combine with the isocyanate to provide a carbon dioxide blowing agent; and in another polyurethane system a fluorocarbon or freon, which boils at about room temperature, provides the blowing agent. In this system, the blowing agent is trapped in the resin and acts in cooperation with the other constituents of the system to foam the polyurethane. Other systems may be such that the blowing agent is used to provide a cellular structure.

Usually cross-linking and curing of a plural component material is substantially completed in a matter of seconds. Therefore, it is not practical to mix components thereof in a reservoir and then to spray the mixture from a conventional paint spray gun since the components would tend to cross-link and cure in the reservoir before spraying could be effected.

It is, therefore, a desideratum to mix the components in the dispensing device as close as is possible to the orifice from which the mix is ejected, that is, mixing of the several components of the compound should take place substantially contemporaneously with dispensing. Mixing the components of the plural component material within the dispensing device requires the operator to purge the residue of the components from a mixing chamber and the orifice of the dispensing device so that the residue components do not chemically react in the mixing chamber so as to clog the chamber and the orifice or in any other way prevent or inhibit dispensing of the plural component material.

In one device for dispensing polyurethane, components A and B are mixed substantially contemporaneously with spraying; and then, upon cessation of the spraying operation, a reciprocating plunger or piston moves through the mixing chamber to purge the chamber and the orifice of residue components. The reciprocating plunger of this device is cylindrical and has an outside diameter substantially the same as the diameter of the cylindrical mixing chamber and the circular spray orifice so as to physically engage with and displace the residue component materials from the side walls of the mixing chamber and out the orifice. Although satisfactory for its intended purpose, the use of a reciprocating plunger to purge the mixing chamber and spray orifice of the residue of components A and B requires very close diametrical fits to achieve proper cleaning of the mixing chamber and orifice and to prevent harmful leakage of plural component material around the plunger and, possibly, out the front end of the spray device. Such close tolerances of the diametrical fits may be harmfully affected by wear and therefore, the sealing property of each may be affected, possibly resulting in leakage of component material from the spray device. Further, the reciprocating plunger is unable to effectively remove residue component material from the apertures used to introduce the component material into the chamber. Such residue material present in the apertures may tend to clog such apertures thereby undermining the further operation of the device until such apertures are cleaned. In addition, the reciprocating plunger can only be used with a circular orifice of substantially the same diameter as the plunger. A circular spray orifice tends to limit the gun to providing a circular spray pattern when in some conditions, a spray pattern of another configuration may be desirable.

This and other methods and apparatus related to dispensing plural component material mixed internally of the apparatus and purging the apparatus of mixed plural component material include those in U.S. Pat. Nos. 3,122,326; 3,263,928; 3,291,396; 3,232,540; 3,375,978; 3,176,922; 3,437,273; 3,504,855; 3,708,123 and German Gebrauchsmuster No. G 70 06 182.4.

To improve the means and method used to purge the mixing chamber of residue components of plural component materials, we have devised a dispensing device which quickly and efficiently purges a movable mixing chamber of such residue component materials without the use of a reciprocating plunger passing through the mixing chamber to purge the chamber and orifice. Generally speaking, the present invention includes a mixing chamber that is movable with respect to the housing of the device so that moving the mixing chamber to the mix position causes the components of the plural component material to be introduced into the mixing chamber, appropriately mixed and then dispensed; and thereafter moving the mixing chamber to the purge position terminates the introduction of components into the mixing chamber and introduces a suitable gas into the mixing chamber to substantially purge residue component material from the mixing chamber and its cooperatively associated orifice. The compressed gas, such as air, can be employed during the dispensing of the mixture of component materials of the plural component material so as to assist in atomizing particles of the material from the terminus of the mixture of plural component material as such material is ejected from the orifice of the device and to assist in shaping the spray pattern of the plural component material particles. It is to be understood that the air can be used mainly to assist in shaping the spray pattern and not to assist in atomizing particles from the terminus of the ejected mixture if particles are atomized from the terminus of the ejected mixture as a result of subjecting the mixture to a high internal pressure while within the spray device. In this instance, hydrostatic forces are used to assist in atomizing the mixture as it is ejected from the orifice of the dispensing device.

3

The appended drawings are intended to illustrate devices embodying the concepts of the present invention constructed to function in the most advantageous mode presently devised for the practical application of the principles involved in this invention.

Figure 1:
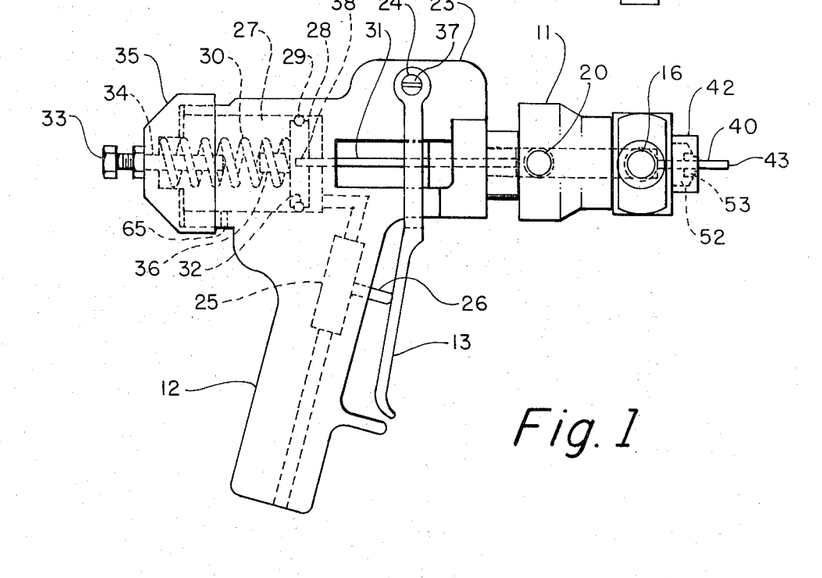
FIG. 1 is a side view, with portions in dotted lines, of a plural component dispensing device embodying the concepts of the present invention.
Figure 2:
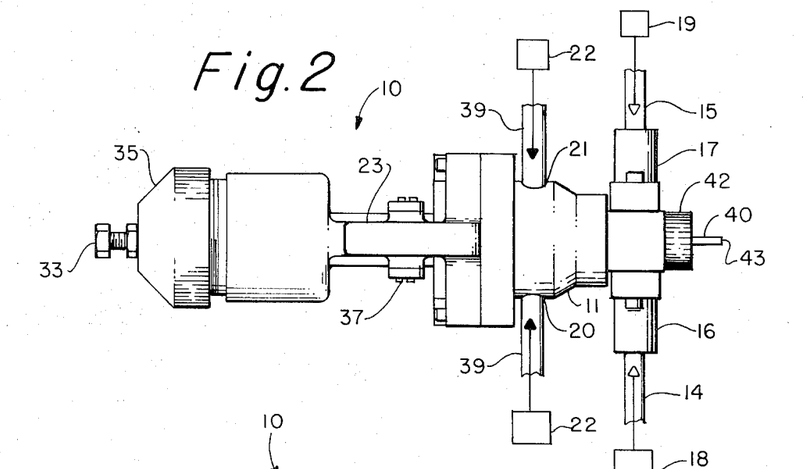
FIG. 2 is a top view of the dispensing device shown in FIG. 1.

Referring now to FIGS. 1 and 2 of the drawing, a plural component dispensing device or hand gun incorporating the concepts of the present invention is indicated by reference number 10. The plural component dispensing gun 10 includes housing or barrel 11, handle 12 extending from the barrel at an angle thereto, and trigger 13. The barrel 11, the handle 12 and the trigger 13, as well as appropriate other parts of the gun 10, may be fabricated from any suitable wear resistant material that is chemically inert with respect to components A and B or the compound which results from the components being mixed. A suitable material is metal including aluminum, aluminum alloys, steel, or plastic such as acetal resin, epoxy, glass filled epoxy, glass filled nylon and the like.

Component A conduit 14 and component B conduit 15 are connected to inlet block 16 and inlet block 17, respectively, located at about the front end of the gun 10 as illustrated in FIG. 2. The inlet blocks 16 and 17 are fabricated from any suitable material chemically inert to component A and to component B, such as aluminum, aluminum alloys and the like. Conduit 14 connects gun 10 to reservoir 18 containing, for example, component A. Conduit 15 connects gun 10 to a reservoir 19 containing, for example, component B. Where necessary, it is to be understood that the joints and the like between various parts of the gun 10 are to be sealed by a suitable means so as to substantially prevent the escape of component material and/or fluid material from the joints between various parts of the gun.

Two hoses 39 near the front end of the spray gun 10 connect inlet ports 20 and 21 of the gun 10 through suitable fluid regulating valves (not shown) to a source 22 of gas under pressure. The regulating valves are used to regulate the fluid pressure supplied to inlet ports 20 and 21. A suitable gas is compressed air. The hoses 39 may be connected to a single source 22 through an appropriate "T" coupling or fitting (not shown). The air is used to purge the gun 10 of substantially all of the residue of components A and B upon cessation of dispensing of components A and B; and during dispensing of the mixture of plural component material the air from source 22 may be used, if desired, to atomize the mixed component material ejected from gun 10, and/or used to shape the spray pattern projected from the gun.

Under certain circumstances, it may be desirable to use gun 10 as a plural component pouring device in which case air would not be used to atomize the component material or shape the pour pattern but air would be used to purge the gun of residue component material. The means and method of mixing the several components within gun 10 and subsequent purging of the residue component material from the gun will be more fully described hereinlater.

As shown in FIG. 1, trigger 13 of suitable length is pivotally connected to main body section 23 of gun 10. The trigger 13 is pivoted about axis 24 provided by bolt 37 used to retain the trigger on the gun 10.

Pivotal displacement of trigger 13 toward handle 12 causes the trigger to engage with and depress valve plunger 26 which in turn activates air valve 25. The activated air valve 25 allows air to flow through the valve to air actuated means 27 carried by the main body 23 of the gun 10. The air actuated means 27 includes a disk-shaped piston means 28, a seal means 29, spring bias means 30 and a displaceable rod 31 suitably connected to the piston means 28. The piston means 28 may include a threaded recess (not shown) the threads of which are in mating engagement with the threads at the extremity 38 of the displaceable rod 31. The seal means 29 is retained in fixed position with respect to the piston means 28 by circumferential groove 32 formed in the periphery of the piston means. The seal 29 may be fabricated from a suitable material such as polytetrafluorethylene, polyurethane and the like.

The elevated air pressure acting against piston 28 causes the piston to be displaced from its normal position, as shown in FIG. 1, toward the rear of the gun 10 thereby displacing the rod 31 toward the rear of the gun. Displacement of the piston means 28 toward the rear of the gun 10 compresses bias means 30 storing energy therein. One end of the bias means 30 abuts the end wall of cap 35 whereas the other end of the bias means abuts the piston 28 of the gun 10. It is seen that the bias means 30 is confined between rear wall of cap 35 and the piston 28 so as to bias rod 31 toward the front end of the gun 10. The bias means 30 may be any suitable compression spring such as a coil spring and the like.

Exhaust of the elevated air pressure acting against piston 28 occurs through the air valve 25 by allowing the trigger 13 to return to its initial position and allows the energy stored in the bias means 30 to be released thereby acting to return rod 31 to its normal position, that is, the position illustrated in FIG. 1. The degree of displacement of rod 31 by the piston 28 can be regulated by turning bolt 33 into or out of threaded bore 34 formed in rear cap 35. Cap 35 is used to close the rear end of the main body 23 of the gun. Bolt 33 is axially aligned with cylindrical projection 36 carried by piston 28 such that after determined rearward displacement of the piston, and hence projection 36, the projection engages with the tip of bolt 33 preventing further displacement of the piston in the rearward direction. A build-up of air pressure between cap 35 and piston 28 is prevented during rearward displacement of the piston by allowing air to bleed through aperture 65 shown in dotted lines in FIG. 1. Other means known to those skilled in the moving piston art could be substituted for air actuated means 27 and thereby used to move rod 31.

Figure 3:
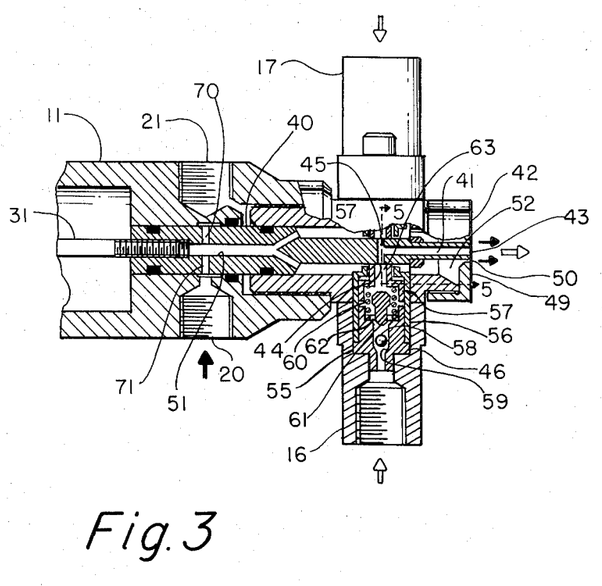
FIG. 3 is an enlarged partial cross sectional view of the mixing chamber and the orifice of the dispensing device shown in FIG. 1, the mixing chamber and the orifice being in the mix and dispense position.
Figure 4:
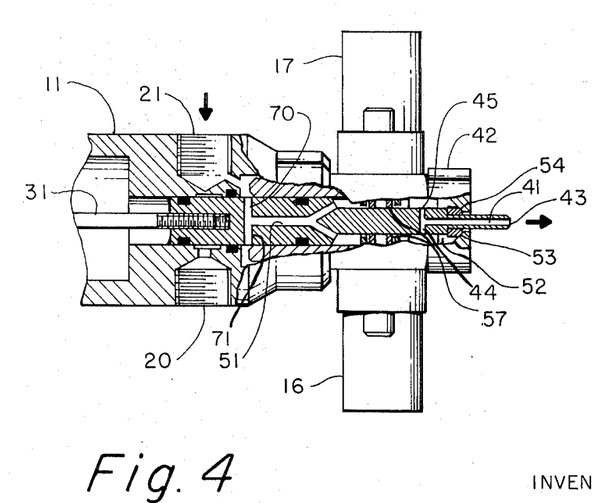
FIG. 4 is an enlarged partial cross sectional view of the mixing chamber and the orifice of the dispensing device shown in FIG. 1, the mixing chamber and the orifice being in the purge position.

Referring now to FIGS. 3 and 4, the forwardmost end of rod 31 is threadedly received in movable elongated means 40. Elongated means 40 has formed therein mixing chamber 41 and orifice 43. The elongated means may be fabricated from any suitable material such as steel and the like. Movement of rod 31 toward cap 35 causes a like rearward movement of the elongated means 40 and hence a rearward movement of mixing chamber 41 and orifice 43. The rearward movement of the mixing chamber 41 and orifice 43 continues until the mixing chamber 41 is in such a position as to allow the introduction of components A and B into the mixing chamber through apertures 44 and 45. During dispensing of plural component material from the gun 10, the flow of components A and B to the gun is, preferably, constant and at a volume ratio of about one part component A to about one part of component B although other volume ratios can be employed, if desired.

The elongated means 40 is located in the housing or barrel 11 of spray gun 10. The elongated means 40 includes orifice 43, mixing chamber 41 in which mixing of components A and B is accomplished, a plurality of inlet openings or apertures 44 and 45 communicating with the mixing chamber 41 and adapted to be connected to either the reservoirs 18 and 19 of plural component material or to the purging air source 22, and a plurality of holes 70 and 71 adapted to be connected to the source 22 of compressed air. Rod 31 is used to move mixing chamber 41 with respect to the barrel 11.

As shown in FIG. 3, apertures 44 and 45 may be connected to the inlet blocks 16 and 17 through suitable seal and check valve assembly 46. The seal and check valve assembly 46 associated with inlet block 16 is illustrated in FIG. 3, whereas only a portion of the seal and check valve assembly 46 associated with inlet block 17 is shown in FIG. 3. The structure of a suitable check valve assembly will be discussed hereinlater.

In the drawing the cross sectional dimensions of mixing chamber 41 and orifice 43 are shown to be round. Although not absolutely necessary, the cross sectional dimension of the orifice 43 and of the mixing chamber 41 are illustrated as being substantially the same. It may well be that under certain operating circumstances, a more advantageous spray or pour pattern is realized when orifice 43 has a cross sectional configuration different from that of the mixing chamber 41. For example, the cross section of the mixing chamber 41 may be substantially circular to facilitate, among other things, mixing of the compounds A and B, whereas the cross section of the orifice 43 may be elliptical or any other cross sectional configuration necessary to provide the type of spray or pour pattern desired.

Figure 5:
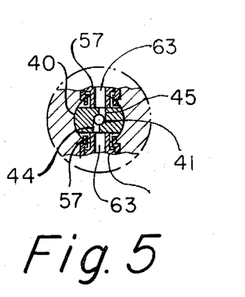
FIG. 5 is an enlarged partial sectional view of the mixing chamber taken across the lines 5—5 of FIG. 3.

Component A is introduced into the mixing chamber 41 through aperture 44 and inlet block 16. Preferably, the axis of the aperture 44 is substantially tangential with respect to chamber 41 as shown in FIG. 5. Component B is introduced into the mixing chamber 41 through aperture 45 preferably spaced about 180° from aperture 44 and preferably substantially tangential with respect to chamber 41. Preferably, the axes of the apertures 44 and 45 lie in a common plane perpendicular to the axis of the mixing chamber 41. It is to be understood that a plurality of smaller apertures may be substituted for each of the larger apertures 44 and 45. The introduction of components A and B tangentially with respect to the mixing chamber 41 appears to result in turbulence sufficient to effect appropriate mixing and agitation of the components. However, it is to be understood that apertures 44 and 45 may intersect the mixing chamber 41 chordally and may be spaced rearwardly of the orifice 43 at unequal distances so long as appropriate mixing and agitation of the dispersed components is realized. The mixing components A and B are ejected from orifice 43 substantially contemporaneously with mixing and agitation in the chamber 41.

Front end cap 42 is located at the forward end of barrel 11 of gun 10 and is used to close the forward end of the barrel. End cap 42 is suitably attached to the barrel 11 such as by threadedly engaging the forward end of the barrel. The end cap 42 may be fabricated from the same material as is the barrel. The cap 42 includes an inwardly projecting flange 49 which serves to provide opening 50. Opening 50 has a diameter that is slightly larger than the outside diameter of the portion of the elongated means 40 having formed therein the mixing chamber 41 and orifice 43. The opening 50 permits a jet of air to flow around the orifice 43 during the dispensing of the plural component material so as to appropriately interact with the mixture of components A and B being ejected from orifice 43. The interaction of the air flowing from opening 50 and around orifice 43 may be used to assist in atomizing plural component particles from the terminus of the mixture ejected from orifice 43 of the gun 10 and is used to shape the spray pattern of the atomized particles.

Rod 31, rearwardly of chamber 41, is used to displace or move mixing chamber 41 and orifice 43 with respect to barrel 11 to a position so as to either initiate or terminate ejection of plural component material from gun 10 and cause the mixing chamber 41 to be purged of the residue components A and B. With trigger 13 pivotally displaced toward handle 12, rod 31 and, hence, elongated means 40 with mixing chamber 41 formed therein are moved to the position illustrated in FIG. 3. The apertures 44 and 45 are positioned or located such that components A and B are caused to be introduced into mixing chamber 41, mixed and agitated, and ejected from the orifice 43. Gas, preferably a jet of compressed air, flows from source 22 through inlet port 20 formed in barrel 11 and into opposed holes 70 and 71 formed in the elongated means 40, down passageway 51 also formed in the elongated means, into compartment 52, and out opening 50 adjacent the orifice 43, so as to appropriately interact with the terminus of the mixture of components A and B ejected from the orifice to assist in atomizing the mixed material and to assist in shaping the spray pattern of atomized material. A suitable pressure for the jet of air used to assist in atomizing the plural component material ejected from orifice 43 is about 2 to 15 pounds per square inch or higher in chamber 52. In the event one desires to use gun 10 as a plural component pour device, gas flow from source 22 to opening 50 is terminated during the dispensing of mixed materials from the gun.

Referring to FIGS. 1 and 4, with trigger 13 in its normal position, apertures 44 and 45 are positioned or located such that components A and B are prevented from being introduced into mixing chamber 41. Holes 70 and 71 of elongated means 40 are now in communication with source 22 of air through inlet port 21 formed in barrel 11 and a fluid pressure regulating means (not shown). Purging air under suitable pressure as determined by the pressure regulating means (not shown) flows from inlet port 21 through holes 70 and 71 and passageway 51 and into compartment 52 where such air now flows through apertures 44 and 45 and out orifice 43. Such a position or location of the apertures is more clearly shown in FIG. 4. Rod 31 has moved the mixing chamber 41, apertures 44 and 45, and orifice 43 such that the apertures 44 and 45 are positioned within compartment 52 formed by the structural cooperation between the forward end of the barrel 11 and end cap 42. As shown in FIG. 4, opening 50 is substantially completely closed by seal 53 engaging with chamfer 54 of flange 49. Seal 53 may be fabricated from any suitable resilient material such as nylon or the like. During the movement of the elongated means 40 forwardly, compressed air flowing in compartment 52 is caused to flow through apertures 44 and 45 in the compartment to initiate purging of chamber 41 and orifice 43 of the residue of components A and B. Further forward movement of the elongated means 40 causes seal 53 carried by the outer periphery of the mixing chamber 41 to engage with the chamfer 54 of end cap 42 in such a manner as to substantially terminate air flow from opening 50 so that substantially all the air flow from the source 22 is directed through apertures 44 and 45 and mixing chamber 41 and out orifice 43 thereby purging the apertures, the mixing chamber and the orifice of the residue of components A and B.

Carried by each of the inlet blocks 16 and 17 is seal and check valve assembly 46. The seal and check valve assemblies 46 are used to provide a seal between inlet blocks 16 and 17 and the apertures 44 and 45. A seal and check valve assembly 46 is shown in FIG. 3 as being between the inlet block 16 and aperture 44. Each seal and check valve assembly 46 includes a valve body 55, a valve cylinder 56, a valve seal 57 that abuts with a flat side of the elongated means 40 as shown in FIG. 5, a ball 58, a chamfer 59, a compression spring 60 and a ball stop 61. Component material flowing from component reservoir 18 into the inlet block 16 causes ball 58 to be displaced from chamfer 59 so as to permit the component material to flow therearound. The ball 58 is prevented from being displaced from the valve body 55 by ball stop 61. Component material flows by stop 61 through a plurality of openings 62 formed therein. The component material flows into aperture 44 via outlet port 63 provided in the valve seal 57. The valve assembly 46 is divided into two main sections, one section, check valve 55, which houses ball 58 and ball stop 61; the other section, seal 57, is biased against a flat side of elongated means 40 so as to provide a seal between the inlet block 16 and the mixing chamber 41. The means used to appropriately bias the seal 57 against the flat side of elongated means 40 is compression spring 60 and fluid pressure present within valve assembly 46. The valve body 55 and the valve seal 57 are fabricated from a suitable resilient material that is chemically inert with respect to components A and B such as acetal resin or the like. It is to be understood that the seal and check valve 46 carried by inlet block 17 is substantially identical to seal and check valve 46 illustrated in FIG. 3. Accordingly, in the interest of more clearly showing the concepts of the invention, a showing of that valve has been omitted from the drawing.

The plural component material may be any suitable thermoplastic or thermosetting material such as urethane foams and coatings, catalyzed polyesters, catalyzed epoxies and the like. The foam form of polyurethane may be either flexible or rigid, hard or resilient depending on the components and method of foaming. Component A such as diisocyanate is mixed and properly agitated with component B including a polyether resin such as polypropylene glycol, a catalyst (amines, tin soaps or organic tin compounds), a surfactant and blowing agent. In other polyurethanes water is used to react with the isocyanate groups to cause crosslinking and curing, and also is used to produce carbon dioxide which causes foaming. Flexible urethane foams are generally based on polyoxypropylenediols of about 2,000 molecular weight and polyoxypropylene tiols with molecular weights up to 4,000. The triols may use glycerin as a starter material. Rigid foams are based on polyethers made from compounds such as sorbitol, methyl glucoside, surcrose and certain aromatic derivatives.

With this disclosure in mind and by continued reference to the several figures of the drawing, the following description of the operation of the plural component dispensing device 10 is given.

Assuming that an operator pivotally displaces trigger 13, air flows to air actuated means 27 displacing rod 31 rearwardly thereby moving elongated means 40 and its mixing chamber 41 rearwardly from the front end of the gun 10. The elongated means 40 including its mixing chamber 41 is moved from its normal position as shown in FIG. 4 to the dispensing position as shown in FIG. 3. Apertures 44 and 45 are now substantially aligned with the outlet ports 63 of cooperatively associated seal and check valves 46. Components A and B are introduced tangentially to the mixing chamber 41 through apertures 44 and 45 respectively (see FIG. 5). A rapidly swirling mass of materials is provided within the mixing chamber 41 so that components A and B are thoroughly mixed and agitated. The components are introduced into mixing chamber 41 under a pressure of about 100 to 1,000 pounds per square inch or more. Air flowing from opening 50 and about orifice 43 interacts with the terminus of the mixture of components A and B ejected from the orifice to assist in atomizing the mixture and in shaping of the spray of component material particles. The air is supplied to opening 50 from source 22 through inlet opening 20, holes 70 and 71, passageway 51, and compartment 52. The air pressure in compartment 52 may be, for example, about 2 to 15 pounds per square inch and is regulated by a needle valve or the like (not shown).

Discontinuing the dispensing operation is accomplished by allowing trigger 13 to pivotally return to its normal position by the operator releasing the pressure applied to the trigger. The energy stored by spring 30 during the initial pivotal displacement of trigger 13 is released thereby moving forwardly rod 31, and elongated means 40 with its apertures 44 and 45, chamber 41, and orifice 43. Apertures 44 and 45 are slidably disengaged from the valve seals of valve 46 and hence each of the apertures is disconnected from their respective component reservoirs 18 and 19. The apertures 44 and 45 are moved forwardly into compartment 52. As elongated means 40 moves forwardly, holes 70 and 71 move forwardly thereby being disconnected from inlet opening 20 and connected to inlet opening 21. Air is supplied to compartment 52 through inlet opening 21, holes 70 and 71, and passageway 51. The air pressure in compartment 52 is increased to about 50 to 90 pounds per square inch so as to assist in purging the gun 10. At least a portion of the air flowing in compartment 52 flows through apertures 44 and 45 to initiate purging of the residue component material from such apertures, mixing chamber 41 and orifice 43. Continued movement of the rod 31 and elongated means 40 forwardly causes seal 53 carried by the elongated means to be seated against chamfer 54 in opening 50 thereby substantially preventing further air flow from opening 50. Substantially all the air flowing from source 22 is directed through the apertures 44 and 45 and chamber 41 and orifice 43 thereby purging the apertures, mixing chamber and orifice of residue component material. The apertures 44 and 45, mixing chamber 41 and orifice 43 are substantially completely purged of component material thereby preventing harmful clogging of the spray gun.

Figure 6:
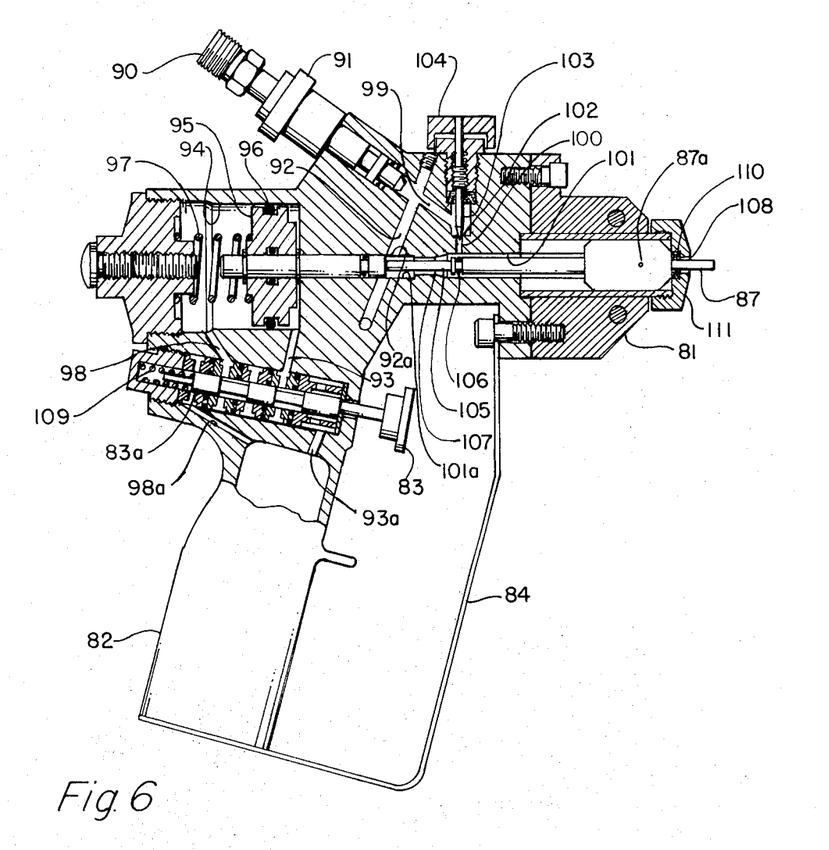
FIG. 6 is a partial sectional view of another embodiment of this invention.
Figure 7:
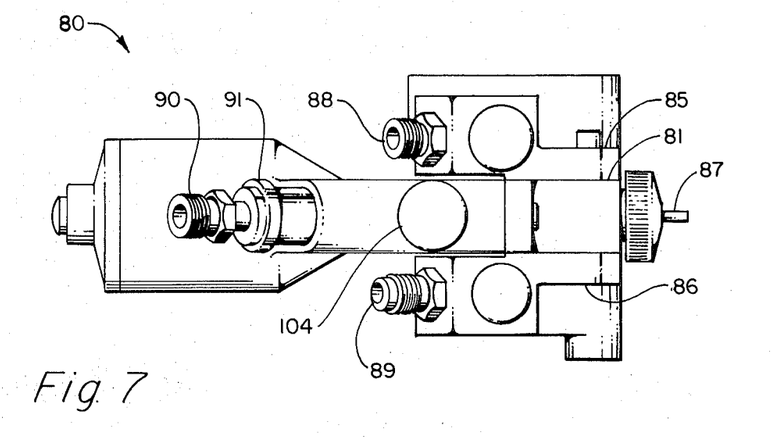
FIG. 7 is a top view of the embodiment shown in FIG. 6.

FIGS. 6 and 7 illustrate another embodiment of the invention. The plural component gun 80, shown in FIGS. 6 and 7, includes a housing 81, a handle 82 and a trigger 83. A guard 84 extends between the housing 81 and the base of handle 82. Like the embodiment illustrated in FIGS. 1–5, the means forming connections 85 and 86 for the components of the plural component material are removably carried at the forward end of housing 81 adjacent the means forming the mixing chamber 87. Connections 85 and 86 are adapted to be connected with separate sources of supply of each of the components of the plural component material and the adaptation includes fitting 88 of connection 85 and fitting 89 of connection 86. Means forming the mixing chamber 87 includes two flat and smooth surfaces that include apertures 87a intersecting a bore (unshown) that forms the mixing chamber in the manner shown in FIGS. 3 through 5. These flat smooth surfaces cooperate with seals carried by connections 85 and 86 to block the flow of components from the separate sources of supply when the gun is not operating. Positioning apertures 87a in communication with connections 85 and 86 permits a flow of the components to be directed into the mixing chamber through the apertures.

In this embodiment, fittings 88 and 89 project upwardly and rearwardly of connections 85 and 86 so that hoses supplying the plural components from their respective sources of supply will be carried by the gun over the handle. Likewise, in this embodiment the source of air under high pressure is connected to gun 80 at fitting 90 which projects upwardly and rearwardly from housing 81. A valve 91 is provided between fitting 90 and housing 81 to remove air pressure from the gun when it is not in operation. With valve 91 turned off, the gun cannot be operated.

The compressed air delivered to the gun through fitting 90 is put to a plurality of uses in gun 80. Compressed air flows through passageway 92. Passageway 92 intersects a bore 101a formed within the housing at intersection 92a and extends through a passageway (not shown) to a four-way valve 83a operated by trigger means 83. When the trigger 83 is depressed, compressed air flows through passageway 92, the four-way valve 83a operated by trigger means 83, and is delivered through passageway 93 into cylinder 94 forwardly of piston 95, which is sealed within cylinder 94 by O-ring 96. The compressed air is forced into cylinder 94 and forces piston 95 rearwardly against the force of spring 97. The air in cylinder 94 rearwardly of piston 95 is exhausted through the four-way valve 83a into handle 82 through passageways 98 and 98a.

Compressed air is also directed through passageways 99 and 100 into a compartment 101 formed within the housing and within which the means forming the mixing chamber 87 moves. As shown in FIG. 6, a valve seat 102 is formed at the entrance of passageway 100. An adjustable needle 103 is threadedly carried in housing 81, and a knob 104 at the top of the gun permits the adjustment of air pressure flowing into compartment 101 through passageway 100.

Operation of the plural component gun shown in FIGS. 6 and 7 is begun by opening valve 91 to permit air pressure within housing 81 of the gun. Upon actuation of trigger 83, compressed air flows through passageway 92, trigger valve 83a, and passageway 93 to operate piston 95. Piston 95 moves rearwardly within cylinder 94 pulling rod 105 and the means forming the mixing chamber 87 rearwardly within the housing. At the rearward position an air seal 106 is pulled within an air-passing portion 107 formed by cooperation of the housing 81 and rod 105. Seal 106 thus blocks the flow of high pressure air from intersection 92a forwardly within the gun. In this first position, apertures 87a directly adjoin connections 85 and 86 and the components of the plural component material are permitted to flow through apertures 87a into the mixing chamber for mixing and dispensing through an orifice (unshown) at the front of means 87. If adjustable valve 103 is removed from needle seat 102, compressed air at reduced pressure flows into compartment 101 and forwardly through an annular orifice 108 surrounding the forwardly-extending, orifice-forming portion of means 87. Adjustment of needle valve 103 with respect to needle seat 102 will permit the operator to control the extent to which the compressed air flowing through compartment 101 and annular orifice 108 interacts with the mixed plural component material expelled from mixing means 87.

Operation is terminated when the operator releases trigger means 83. Spring 109 returns the trigger 83 to its original position. Four-way valve 83a directs a flow of compressed air from passageway 92 through passageway 98 and blocks passageway 98a. Passageways 93 and 93a are connected to atmosphere through the interior of handle 82. Air pressure rearwardly of piston 95 and spring 97 urges piston 95 forwardly, thereby returning the gun to the position shown in FIGS. 6 and 7 by moving rod 105 and mixing means 87 forwardly within the housing of the gun to effect purging of the gun. In this forward movement, seal 106 is moved forwardly out of sealing relationship with air-passing portion 107, thus high pressure air is transmitted directly from the source through passageway 92, passageway exit 92a, and air-passing portion 107 to compartment 101. In the second position, apertures 87a are moved from their sealed relationship in communication with connections 85 and 86; connections 85 and 86 are sealed by the flat smooth surfaces of the means forming the mixing chamber 87; and apertures 87a open into compartment 101. A seal 110 is carried by the means 87 at its forward end around the portion of means 87 that forms the dispensing orifice. Means 87 in its forward movement seats seal 110 against a cooperative portion of end cap 111 and closes annular orifice 108 at the front compartment 101. Thus, the high pressure air is forced from compartment 101 through orifices 87a and the dispensing orifice in front of means 87, purging the interior of the mixing chamber.

If the gun is not to be operated soon, valve 91 permits the operator to shut off the compressed air after the gun has been purged of the mixed component material. Spring 97 retains means 87 forwardly within housing 81 and thus retains gun 80 in its off position.

While in the embodiments shown, the means forming the mixing chamber is moved with respect to the connections to the separate component supply means carried by the housing, it is understood that any relative motion between the means forming the mixing chamber and the connections to the separate component supply means can be incorporated into embodiments of this invention. The following example is given with respect to the embodiments of FIGS. 1 through 5 to further illustrate the present invention, but this example is equally applicable to the embodiment of FIGS. 6 and 7.

Example

Component A is 6411 made by PPG Industries of Pittsburgh, Pa. and is methylene diisocyanate having a viscosity of about 250 centipoise at 60°F. Component B is 6,516 SP resin made by PPG Industries of Pittsburgh, Pa. and includes a polyether, an organo tin catalyst, a silicone surfactant and trichlorofluromethane (freon-11) blowing agent. The 6,516 SP resin has a viscosity of about 350 centipoise at about 60°F. Each of the components is heated to a termperature of about 120 to about 130°F prior to spraying and introduced to the gun in equal parts by volume. The pressure of the air in compartment 52 during spraying is about 2 to about 15 pounds per square inch. The pressure of air in compartment 52 during purging is about 50 to about 90 pounds per square inch. The air pressure acting against piston 28 when air valve 25 is actuated is about 70 to about 90 pounds per square inch.

The orifice 43 of spray gun 10 is about 24 to 30 inches from the surface of the target being sprayed. The spraying rate is about 3 to 6 pounds of foam per minute at about 400 to 1,000 pounds per square inch, but much higher spraying rates are possible. The spray gun is pulsed on and off by actuation of the trigger 13. No deleterious clogging of the gun is noted. The foam provided is about 2 inches thick and is rigid, uniform, and has no readily apparent deleterious gas blow holes.

As noted above, gun 10 can be used as either an air atomizing device, a hydrostatic atomizing device or as a pouring device. However, in each device air is used to purge the apertures 44 and 45 and mixing chamber 41 and orifice 43.

As a matter of convenience, the direction of air flow is indicated by solid arrows, whereas the direction of component material flow is indicated by hollow center arrows in FIGS. 3 and 4 of the drawing.

While the invention is illustrated and described in its presently preferred embodiment, it will be understood that modification and variations may be effected without departing from the scope of the novel concepts of this invention and as set forth in the appended claims.

We claim:

1. An apparatus for dispensing a plural component material comprising
   a housing,
   means including a chamber for mixing the components of the plural component material terminating in an orifice, said chamber being carried within and movable with respect to the housing,
   means including spaced-apart apertures communicating with the mixing chamber and movable therewith, the apertures being spaced from the orifice, and
   means adapted to move the mixing chamber and the apertures within the housing from a position where the apertures introduce to the chamber the components of the plural component material to be mixed and dispensed from the orifice to a position where the introduction of the components to the chamber through the apertures is terminated and air is introduced through the apertures to purge component material from the apertures, the mixing chamber and the orifice.

2. The apparatus for dispensing plural component material as claimed in claim 1, wherein the means including each of the spaced-apart apertures directly adjoins a separate source of each of the components, said apertures having a short length tangential to the mixing chamber.

3. The apparatus for dispensing plural component material as claimed in claim 2, wherein the one aperture is spaced on the periphery of the mixing chamber walls about 180° from another aperture.

4. The apparatus for dispensing plural component material as claimed in claim 3, wherein the cross sectional area of the orifice is substantially the same as the cross sectional area of the mixing chamber.

5. The apparatus for dispensing plural component material as claimed in claim 1, wherein the air is used to assist in atomizing the material upon ejection from the orifice.

6. Apparatus for mixing the plural components of a multicomponent material and dispensing or spraying the mixed material comprising
   a housing including an opening in its forwardmost end, said housing being adapted to connect the opening to a source of air, and being adapted at its forward end to carry connections to separate means to supply the components of the multicomponent material;
   movable means carried by the housing, said movable means including a mixing chamber for the components and an orifice connected with the mixing chamber to dispense the mixed material, and separate apertures for each of the components of material opening into the mixing chamber; and
   an actuator to move said movable means with respect to the housing between a first position where each of the separate apertures directly adjoins each of the connections to the separate component-supply means and permits flow of the components through the apertures to the mixing chamber, said orifice from which mixed material is dispensed being located at said first position so that a flow of air can act on the mixed multicomponent material, and a second position where said movable means blocks each of the separate component-supply means and terminates the flow of mixed material, and where the apertures are positioned in communication with the source of air to direct a flow of air through the apertures, the mixing chamber and the orifice for purging and cleaning.

7. The apparatus as set forth in claim 6, wherein the movable means is slidably carried within the housing behind the opening and includes a forwardmost portion of reduced size capable of extending through the opening, said forwardmost part of the movable means and the housing forming an air chamber adjacent the opening, wherein the movable member carries a seal on the forwardmost part adapted to cooperate with a portion of the housing rearwardly of the opening to seal this opening, and wherein at the second position the apertures are positioned in the air chamber and the seal on the movable means is seated on the housing to close the opening.

8. The apparatus as set forth in claim 7, wherein the forwardmost part of the movable means moves through said opening and air is permitted to flow through said opening as said movable means slides from said first position to said second position.

9. The apparatus as set forth in claim 6, wherein said housing includes first means to supply air at high pressure to said movable means and second means to supply air at controlled pressure to said movable means, and at said first position the movable means blocks flow from said first means and directs a flow of air at controlled pressure from said second means through said opening for atomization of the mixed material, and at said second position said movable means directs a flow of air at high pressure from said first means to clean said spaced-apart apertures, the mixing chamber and the orifice.

10. The apparatus as set forth in claim 6, wherein said housing includes a handle, and said actuator is operated by a trigger attached to said housing and includes an energy storage means to automatically slide said movable means from said first position to said second position upon release of said trigger.

11. Apparatus for mixing the plural components of a multicomponent material and dispensing the mixed material, comprising a housing including an opening in its forwardmost end, said housing being adapted to connect the opening to a source of air, and being adapted to carry connections to separate means to supply the components of the multicomponent material;

movable means slidably carried within the housing, said movable means being adapted to seal the connections to the separate component supply means and to the air opening of the housing and including a mixing chamber for the components and an orifice connected with the mixing chamber to dispense the mixed material, and separate apertures for each of the components of material opening into the mixing chamber; and an actuator to slide said movable means with respect to the housing between a first position where each of the separate apertures are positioned in communication with each of the connections to the separate component-supply means and permits flow of the components through the apertures to the mixing chamber, and a second position where said movable means seals each of the separate component-supply means and the air opening of the housing and terminates the flow of mixed material, and where the apertures are positioned in communication with the source of air to direct a flow of air through the apertures, the mixing chamber and the orifice for purging and cleaning.

12. The apparatus as set forth in claim 11, wherein said housing includes first means to supply air at high pressure to said movable means and second means to supply air at controlled pressure to said movable means, and wherein at said first position the movable means seals said first means and directs a flow of air at controlled pressure from said second means through said opening for atomization of the mixed material, said orifice from which mixed material is dispensed being located at said first position in said opening, and wherein at said second position, said movable means directs a flow of air at high pressure from said first means to clean said separate apertures, the mixing chamber and the orifice.

13. A gun for mixing and spraying the plural components of a multicomponent material comprising a housing including an air chamber with an opening at its forwardmost end, said housing being adapted to connect the air chamber with a source of air, and being adapted to carry connections to separate means to supply the components of the multicomponent material;

a movable valve-forming means slidably carried within the housing, said movable valve-forming means including a portion including a mixing chamber for the components with a dispensing orifice and including outer surfaces adapted to seal the connections to the separate component supply means but having apertures connected with the mixing chamber, and a seal to cooperate with the housing in the air chamber to close the opening; and actuator means to slide said movable valving means within the housing between a first position where the apertures of the outer surfaces are positioned in communication with the separate component supply means to permit flow of the components through the apertures to the mixing chamber, said dispensing orifice for mixing material being located at said first position in the housing opening so that a flow of air can break up the mixed multicomponent material, and a second position where the outer surfaces block the separate component supply means and terminate the flow of mixed material, the apertures are positioned in the air chamber, and the seal on said movable means is seated on the housing to close the opening and direct a flow of air through the apertures, the mixing chamber and the orifice for purging and cleaning.

14. The apparatus as set forth in claim 13, wherein said movable valve-forming means includes an air-passing portion between the air chamber and air source carrying a seal, wherein said housing includes first means to supply air at high pressure to said air-passing portion of the movable valve-forming means and second means to supply air at controlled pressure to said air-passing portion of the movable valve-forming means, and wherein at said first position the seal carried by the air-passing portion blocks air flow from said first means and permits a flow of air at controlled pressure through said air-passing portion to said air chamber in said housing and through said opening for atomization, and at said second position, said air-passing portion permits a flow of air at high pressure through the air-passing portion to the air chamber to clean the apertures, the mixing chamber and the orifice.

15. The apparatus as set forth in claim 14, wherein high pressure air is permitted to flow through said opening as said movable valve-forming means slides from said first position to said second position.

16. The apparatus as set forth in claim 13, wherein the portion of the movable valve-forming means defining the dispensing orifice is of reduced size capable of extending through the opening of the housing and the actuator means slides the movable valve-forming means forwardly within the housing moving the dispensing orifice forwardly through the opening at the second position.

17. A method of forming a layer of foam material on a substrate comprising supplying each of the several foam components to be reacted together under pressure to a mixing means at a dispensing zone, supplying air under pressure to a mixing means at a dispensing zone, moving the mxing means to a dispensing position thereby permitting a flow of each of the foam components into the mixing means, mixing the foam components by the mixing means to initiate a reaction and to form a foam, and dispensing the mixed foam components through a dispensing orifice and simultaneously directing a flow of air to break the dispensed foam material into particulate form before significant foaming begins and to direct the particles at the substrate, and depositing the foam material in particulate form on the substrate and completing the foaming reaction of the material on the substrate to form a layer of foam adhering to the substrate.

18. The method of claim 17 including the step of terminating the dispensing of mixed components by moving the mixing means and dispensing orifice to a cleansing position thereby blocking the flow of the components into the mixing means and directing a flow of air through the mixing means and dispensing orifice for purging and cleansing the mixing means and dispensing orifice.

19. The method set forth in claim 17, including blocking the flow of air while said mixing means and orifice are in the dispensing position to permit pouring of mixed material.

20. A hand gun for mixing and dispensing the components of a plural component material capable of connection to separate component supply sources and to a source of compressed air comprising a gun housing forming a handle and a barrel and carrying an actuator controlled by trigger means adjacent the handle, said housing having means adapted for connection to the source of compressed air;

means for connecting said housing to each of the separate component supply sources; and means forming a mixing chamber for the components, including separate apertures for introducing each of the components into the mixing chamber and an orifice to dispense the mixed plural component materials, said means forming the mixing chamber and said means for connecting said housing to each of the separate component supply sources being carried at the forward portion of the barrel to permit movement relative to each other, and said actuator being connected at the front of the barrel to cause, upon actuation of said trigger means, relative movement of said means between a first position where each of the separate apertures directly adjoins each of the connecting means and permits flow of the components through the apertures to the mixing chamber, and a second position where the means forming the mixing chamber blocks each of the connecting means and terminates the flow of mixed material, and where the apertures are positioned in communication with the source of air to direct a flow of air through the apertures, the mixing chamber and the orifice for purging and cleaning.

21. The hand gun of claim 20 wherein the housing includes a plurality of passageways connected with the source of compressed air, one passageway intersecting a bore formed within the housing in which the means forming the mixing chamber moves and a second passageway including an adjustable valve and intersecting the bore, the bore including an air-passing portion between the intersection of the first and second passageways, the means forming the mixing chamber being connected to the actuator by a rod operating a seal wherein at the first position the seal blocks the air-passing portion of the bore so that the bore is connected to the source of compressed air through the second passageway and the adjustable valve, and at the second position the air-passing portion is open so that the bore is connected to the source of compressed air by both the first and second passageways.

22. The hand gun of claim 20 wherein the actuator is air-operated and the trigger means operates a four-way valve to direct a flow of compressed air to the actuator to effect its operation and to move the means forming a mixing chamber between the first and second positions.

23. The hand gun of claim 20 wherein the means forming the mixing chamber includes flat and smooth sides having said separate apertures, and means for being connected to each of the separate component supply means are removably carried by the housing and include seals cooperating with the flat and smooth sides of the means forming the mixing chamber.

* * * * *